United States Patent [19]

French et al.

[11] 4,017,288

[45] Apr. 12, 1977

[54] METHOD FOR MAKING OPTICAL FIBERS WITH HELICAL GRADATIONS IN COMPOSITION

[75] Inventors: William George French, Plainfield; John Burnette MacChesney, Stirling, both of N.J.

[73] Assignee: Bell Telephone Laboratories, Incorporated, Murray Hill, N.J.

[22] Filed: Dec. 15, 1975

[21] Appl. No.: 640,577

[52] U.S. Cl. .................................... 65/2; 65/3 A; 65/13; 65/18; 65/DIG. 7; 350/96 WG; 427/166
[51] Int. Cl.² ................... C03B 37/02; C03C 25/02
[58] Field of Search .................. 65/2, 3 A, 4 B, 13, 65/18, 30 R, DIG. 7; 350/96 WG; 427/166

[56] References Cited

UNITED STATES PATENTS

| 3,741,796 | 6/1973 | Walker | 65/18 X |
| 3,883,336 | 5/1975 | Randell | 65/18 |
| 3,932,160 | 1/1976 | Camlibel | 65/3 A |
| 3,966,446 | 6/1976 | Miller | 65/2 |

*Primary Examiner*—Robert L. Lindsay, Jr.
*Attorney, Agent, or Firm*—Peter V. D. Wilde

[57] ABSTRACT

This application discloses a technique for producing optical fibers with longitudinal variations in index of refraction. The deposition apparatus is arranged to allow for the formation of an intertwined double helix of two different materials. The technique does not require imposing any time dependent conditions on the fabrication apparatus.

4 Claims, 3 Drawing Figures

METHOD FOR MAKING OPTICAL FIBERS WITH HELICAL GRADATIONS IN COMPOSITION

BACKGROUND OF THE INVENTION

1. Field of the Invention

This invention is an improved technique for producing optical fibers.

2. Description of the Prior Art

The many advantages of optical communications, both potential and realized, have stimulated significant efforts towards further development of this field of technology. Advantages that result from the use of visible radiation for the transmission of information were appreciated from the very inception of voice communication. Since these advantages are increased when the optical signal is in the form of coherent light, the discovery of the laser provided added impetus to the development of optical communication systems. Although the realization of a totally optical communication system still seems to be far in the future, the advantages of optical transmission alone are sufficiently impressive to warrant considerable effort in the development of optical transmission systems.

The major advantage in the use of visible and near infrared radiation for transmission purposes is associated with the increase in bandwidth over that available in simple electronic transmission systems. However, to utilize this increased bandwidth a medium capable of transmitting such optical signals must be developed. Basic electromagnetic theory indicates that light traversing a medium of index of refraction $n_1$ will not be transmitted through an interface with a medium of index of refraction $n_2$ if $n_1$ is greater than $n_2$ and if the angle made with the interface is less than arc cosine $n_1/n_2$. Under such circumstances the light is contained in medium $n_2$ and will be transmitted through this medium. This basis principle has led to the development of glass fibers for use as optical transmission lines. In this development a significant hurdle to be overcome is associated with the fabrication of fibers with optical loss low enough for practical applications. In the wavelength range from 4000 Angstroms to 1.5 microns the optical loss should be less than 50 db/km for short distance transmission, and less than approximately 4 db/km for long distance applications.

Additional problems are introduced when in order to effectively carry information the envisioned optical signal is in the form of optical pulses. Such pulses must be individually resolvable at the detecting end of the transmission line, as they were at the launching end. A number of phenomena, however, tend to broaden the pulses and consequently degrade the resolution. One of these phenomena is the frequency dispersion effect. As a result of this effect, light of different frequencies travels at different speeds within the fiber. Consequently, the different frequency components in an optical pulse of light are transmitted at different velocities arriving at the detector at different times, thereby broadening the pulse. The use of highly monochromatic light, e.g., from a laser, helps to alleviate the frequency dispersion problem.

In addition to frequency dispersion, there is a serious mode dispersion effect. This effect may be understood by considering the different paths that a given light ray may take as it traverses the optical fiber. It may, for example, proceed directly down the center of the fiber. On the other hand, it may reflect off the fiber walls numerous times as it traverses the fiber. Different parts of a given pulse may traverse the fiber in different modes and hence with different traversal times. These effects result in a general broadening of the pulse and in a consequent loss of pulse resolution. They are referred to by the term "mode dispersion."

Initial attempts to alleviate this problem involved the fabrication of single mode fibers. Such fibers will support only one specific mode and therefore do not display any mode dispersion. Technical difficulties were, however, encountered with single mode fibers. Launching an optical signal into a small diameter single mode fiber entails severe restraints on the coupling system between the source and the fiber. In addition, single mode fibers cannot efficiently transmit light produced by incoherent sources such as the common light-emitting diodes. Since such light sources are simpler and more economical than lasers, considerable interest has centered about multimode waveguides which can more efficiently transmit such light. In such waveguides the multimode dispersion effect must be reduced in order to maximize the information carrying capacity of the waveguide.

Mode dispersion in a multimode fiber may be minimized by utilizing a fiber that has a radially graded index of refraction. If such a fiber is properly designed, the velocity associated with light traveling near the fiber surface is greater than that associated with light traveling through the center of the fiber. Therefore, a higher velocity is associated with the long path length modes, which spend more time near the fiber surface, than with the short path length modes, which are generally confined to the fiber center. In this manner the transit times associated with the various modes is approximately equalized and the mode dispersion is minimized.

In an article by S. D. Personik in the *Bell System Technical Journal*, Volume 50, No. 3, March 1971, at page 843, an alternative technique for alleviating mode dispersion effects is suggested. Personik shows that while the pulse broadening associated with mode dispersion increases proportionally with the length of the fiber, enhanced and intentional mode conversion results in a broadening effect which is proportional only to the square root of the fiber length. Stimulated by this finding, numerous studies were made to determine the most effective techniques for enhancing mode conversion. One particular method involves the introduction of gradations in the index of refraction of the fiber along the longitudinal direction. However, in order to realize the benefits of intentional mode conversion while maintaining radiation losses within tolerable limits the spatial period of such gradations must be between one and ten millimeters.

Optical fibers are drawn conventionally from preforms that are cylindrical in shape. The preforms are produced by depositing glass-forming materials onto a glass rod or within a hollow glass rod. The material accretes either inward toward, or outward away from, the axis of the cylinder being formed. Copending application Ser. No. 625,318 describes a different approach to fabricating preforms in which the preform cylinder is formed by accumulating material on the planar end of the preform rather than on the curved side. If the composition of the material which is being deposited is varied with time, longitudinal gradations, capable of effecting intentional mode mixing, are formed.

SUMMARY OF THE INVENTION

In the practice of this invention a longitudinally graded fiber may be fabricated without introducing any temporal variation in the material composition being emitted by the deposition device. At least two devices are used, each of which emits a different material. Each device deposits the material axially relative to the preform, for example, by emitting material approximately parallel to the axis of the preform rather than perpendicular to it. The deposition devices are arranged in such a configuration that a double interwined helix of the two different materials is deposited. In this manner longitudinal gradations of adequate resolution may be deposited without any time variation in the deposition process. In the instant invention two devices emit materials of different but constant composition. Unlike the prior technique, the longitudinal gradations in this invention are associated with the topological characteristics of a double helix. In the practice of this invention the spatial extent of the longitudinal gradations is determined by the deposition rate and the rate of rotation of the preform during deposition. Gradations of high resolution may be fabricated so that the fibers drawn from the preform will exhibit enhanced mode conversion and hence minimized mode dispersion.

DETAILED DESCRIPTION

Figure 1:
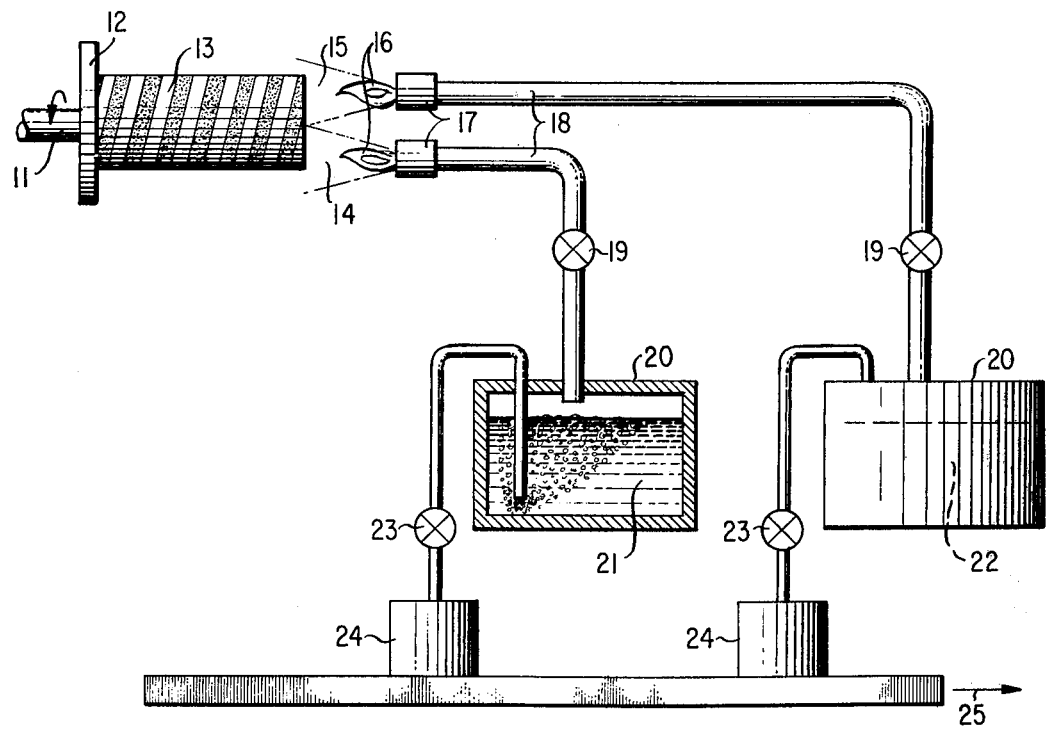
FIG. 1 is a representation of an apparatus by means of which the instant invention may be practiced.

In FIG. 1, an optical fiber is shown being fabricated according to the invention described herein. In this Figure, 12 is a flat starting member rotated by means of a rod 11 about an axis of rotation perpendicular to the flat face of the starting member 12. The glass precursor material or "soot" is deposited by means of at least two deposition devices 17 emitting material from a direction parallel to the axis of rotation of the starting member. In this manner, the preform 13, which is grown on the starting member by the deposition process, is grown axially and along the longitudinal direction. The deposition devices need not be exactly parallel to the axis of rotation but will generally be placed in a manner which allows for the axial growth of the preform.

Figure 2:
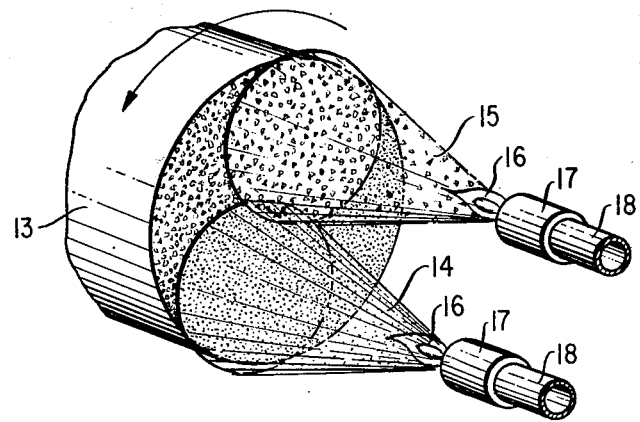
FIG. 2 is a detailed view of the deposition.

An arrangement critical to the practice of this invention involves the development of the helical structure of the preform 13. Such a topological characteristic is produced by utilizing at least two deposition devices, as shown, each emitting a material of different composition and by directing the streams of material emitted by these devices to points of different azimuth on the rotating starting member. In such a manner, an intertwined double helix of the two materials will be formed. Longitudinal gradations will automatically appear, as long as the two deposition devices emit different materials, illustrated in FIG. 1 as 14 and 15. The deposition is shown more clearly in FIG. 2 where the fabrication process is viewed from an end-on direction. The inherent nature of this process is not limited to two deposition devices. Any number of devices may be utilized and intertwined helices of order higher than two may be obtained. The resolution of the gradations will be determined by the combination of the deposition rate and the rotation velocity of the starting member.

It is apparent that the nature of the deposition device is not critical to the practice of this invention. Any deposition process may be used to produce the longitudinally graded fiber described herein, as long as the process is capable of producing streams of glass precursor material amenable to deposition in the form of an intertwined double helix.

For the purpose of illustration, the deposition process described in FIG. 1 is the standard flame hydrolysis burner technique discussed further in U.S. Pat. Nos. 2,272,342, 2,326,059, 3,823,995 and 3,826,560. In the Figure, 17 is a hydrolysis burner, and 16 is the flame in which the glass precursor vapors, supplied through 18, are hydrolyzed to form streams of glass particulate matter, labeled 14 and 15, respectively. The soot production mechanism is well known in the art. Compounds 21 and 22 of silicon, germanium, or other glass precursor elements, are placed in the vessel 20. In order to practice the instant invention, at least two particulate streams of different materials are required and, hence, the vessels shown in FIG. 1 contain different precursor elements 21 and 22. Alternatively additional vessels may supply dopant materials into the material streams thereby yielding two streams of different dopant levels. A carrier gas, such as oxygen, is suplied in a vessel 24 and is bubbled through the compounds 21 and 22. The bubbling rate is controlled by the valve 23 and differs depending upon the compound and the deposition rate required.

Typical compounds which may be used in an embodiment of this invention are silicon tetrachloride and germanium tetrachloride or combinations thereof. The oxygen-carried tetrachlorides are supplied through the valve 19 and the tubing 18 to the burner 17. Although not illustrated in the Figure, additional vessels may be used to add dopant materials into the stream at 18, thereby yielding a convenient method of altering the ultimate composition of the vapor supplied to the burner. Other flame supporting gases necessary for the proper operation of the burner are also supplied, although not shown in the Figure. The hyrolysis which occurs in the flame and its environs results in the transformation of the tetrachloride to an oxide soot which is then deposited, as shown in the Figure.

Although the specifics of the burner design are not essential to the practice of this invention, it may be desirable to utilize a burner jet assembly specifically designed to control the width of the soot stream as well as to increase its uniformity. The use of such a burner will result in a more uniform stream of particles and, consequently, a more nearly constant diameter preform. Significant variations in the preform diameter may be removed during consolidation while smaller diameter variations may be compensated during fiber drawing by varying the temperature of the preform at its drawing point.

While FIG. 1 displays the use of dual burners, the invention is not so limited. Rather, multiple burners may be utilized both to yield higher order intertwined helices, or more complicated spatial variations in the preform material than the simple longitudinal variation displayed in the Figure. So, for example, a third burner may be added to the apparatus shown in FIG. 1, which burner might deposit material to form the central regions of the preform around which the double helix displayed would be fabricated. In such a combination, the radial extent of the streams might be varied during the deposition by altering the flame burning parameters, thereby yielding a more complicated spatial variation in index of refraction. In addition, while the instant invention provides a technique for producing longitudinal variations without the necessity of time variations in the deposition device, such variations may in fact be added to the process described herein in order to yield azimuthal and radial variations in the material composition of the preform. Fibers with such combnations of longitudinal radial and azimuthal variations in index of refraction may be advantageous for certain applications.

As the preform is fabricated the deposition device may be translated in order to allow the perform room for growth. Consequently, the apparatus shown in FIG. 1 is provided with a means 25 for producing relative motion between the deposition device 17 and the preform 13 so that the distance between these two may be maintained substantially constant as the preform increases in length during the deposition.

Figure 3:
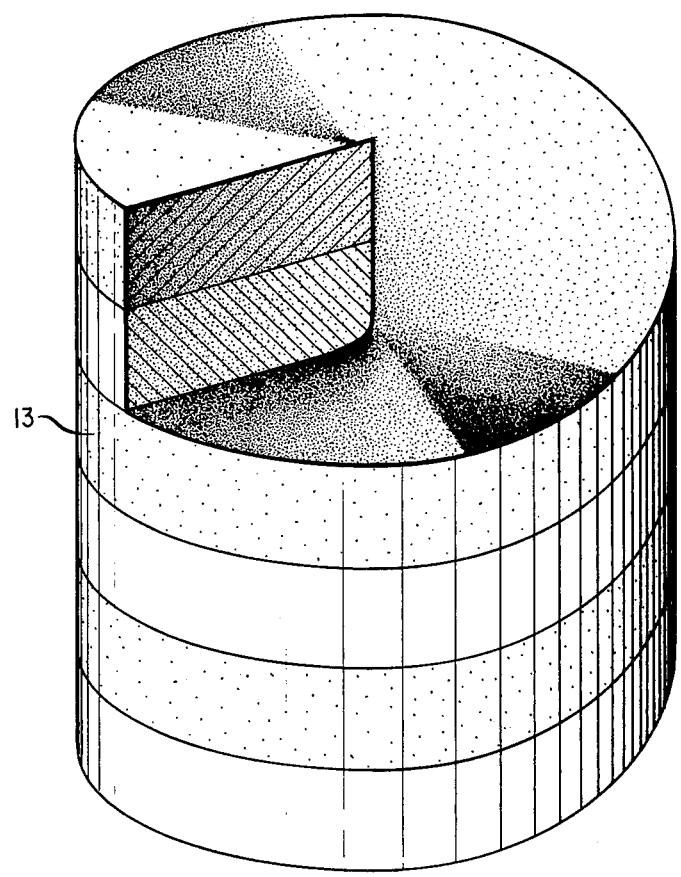
FIG. 3 is a detailed view of an optical fiber fabricated according to the teachings of this invention.

After the preform is grown to a sufficient length, it is consolidated by heating. The consolidated preform is then drawn into an optical fiber, shown in FIG. 3. The drawing may be accomplished by the well-known oven or laser techniques or by any other appropriate technique. The fiber, shown in this Figure, displays not only the longitudinal variations to which this invention is addressed but also the elective radial and azimuthal variations discussed above.

EXAMPLE

In a proposed preferred embodiment of this invention, the desirable parameters may be extracted from a number of experiments which have been performed in this area. The starting member is a plate of fused quartz attached to a rod by means of which it is rotated at 300 revolutions per minute. The glass soot is deposited on the quartz plate using hydrolysis burners which are maintained at a distance of 16 centimeters from the preform as it develops.

Each of the hydrolysis burners consists of a concentric pattern of jets. The center jets emit silicon tetrachloride in the case of one burner and germanium-doped silicon tetrachloride in the case of the other burner, both borne by a flow of oxygen. The oxygen flow rate for the silicon tetrachloride is 1.5 liters per minute while the flow rate for the germanium-doped silicon tetrchloride is 2 liters per minute. Two separate vessels are used to provide for the germanium-doped silicon tetrachloride. One of these vessels contains silicon tetrachloride through which oxygen is flowed at the rate of 1.5 liters per minute. The other vessel contains germanium tetrachloride through which oxygen is flowed at 0.5 liter per minute. Joining the outputs of these two vessels yields a 2 liter per minute flow of germanium-doped silicon tetrachloride to one of the burners. The center jet is surrounded by a series of inner shield jets which emit oxygen at the rate of 5 liters per minute, thereby preventing the buildup of glass soot on the burner face. The inner shield is surrounded by a series of burner jets which emit an appropriate flammable gas, in this case methane, at the rate of 8 liters per minute combined with oxygen flowing at the rate of 6 liters per minute. The burner jets are surrounded by outer jets which emit oxygen at the rate of 7 liters per minute and which are used to direct the flame and the particulate stream. In this manner, as preform of glass soot approximately 10 centimeters long is fabricated in three hours. The diameter of the preform is determined by the flame breadth and in an exemplary embodiment will be 10 millimeters. The combination of the rate of rotation of the starting member and the deposition rate of the hydrolysis burners results in double helical gradations approximately 2 microns in extent.

The soot structure is suspended in an oven by means of the rod attached to the flat starting member and heated in a He atmosphere to a temperature of 1450° C for 1 hour. This consolidates the soot into a glass and results in a 5 centimeter preform with a 5 millimeter outside diameter and 1 micron longitudinal gradations in index of refraction. The preform is then set in a pulling apparatus by means of the aforementioned rod, 11, and is pulled into a fiber. The pulling apparatus includes a furnace heated to 2000° C. The preform is fed into the furnace at a rate of 0.4 millimeter per second and the fiber is pulled at a rate of 1 meter per second yielding a fiber 100 microns in diameter with 2.5 millimeter longitudinal gradations in index of refraction.

The above example is illustrative only and the parameters and techniques mentioned in it may be varied within the scope and spirit of the invention. So, for example, the longitudinal gradations in the completed fiber may be optimized at between 1 and 10 millimeters, depending upon the envisioned wavelength of transmission and the choice of parameters to be optimized. Various glass compounds may be utilized and deposition techniques other than the hydrolysis burner may be used. In addition, the deposition rates and other related processing parameters may be altered within the scope of the invention to optimize particular parameters.

What is claimed is:

1. In a method of producing optical fibers with longitudinal gradations in index of refraction comprising:
   rotating a substantially flat starting member about an axis perpendicular to the flat face of the said member;
   forming thermochemically at least two different materials capable of being consolidated into a glass of optical loss less than 50 db/km and having two different indices of refraction;
   depositing axially the material on the starting member;
   consolidating the structure so formed into a unitary glass body; and
   drawing the consolidated structure into an optical fiber the improvement comprising
   forming the said materials into at least two different streams of different composition; and
   depositing the material by directing each of the material streams onto the starting member to positions differing from each other in azimuth.

2. The method of claim 1 wherein the materials are thermochemically formed using at least two flame hydrolysis burners.

3. The method of claim 1 wherein the materials are capable of being consolidated into a glass of optical loss less than 4 db/km.

4. The method of claim 1 wherein the composition of at least one of the material streams is varied in time.

* * * * *